United States Patent [19]
Blakeney et al.

[11] Patent Number: 5,985,507
[45] Date of Patent: Nov. 16, 1999

[54] SELECTED HIGH THERMAL NOVOLAKS AND POSITIVE-WORKING RADIATION-SENSITIVE COMPOSITIONS

[75] Inventors: Andrew J. Blakeney, Seekonk, Mass.; Sanjay Malik, Cranston; Medhat A. Toukhy, Barrington, both of R.I.; Joseph Sizensky, Seekonk, Mass.

[73] Assignee: Olin Microelectronic Chemicals, Inc., Norwalk, Conn.

[21] Appl. No.: 09/025,640

[22] Filed: Feb. 18, 1998

[51] Int. Cl.⁶ ..................................................... G03F 7/023
[52] U.S. Cl. ........................... 430/190; 430/191; 430/192; 430/193; 528/149; 528/155
[58] Field of Search ................................... 430/192, 189, 430/193, 190, 191; 528/149, 155

[56] References Cited

U.S. PATENT DOCUMENTS

| | | | |
|---|---|---|---|
| 4,564,575 | 1/1986 | Perreault et al. | 430/165 |
| 5,225,311 | 7/1993 | Nakano et al. | 430/190 |
| 5,326,665 | 7/1994 | Osaki et al. | 430/192 |
| 5,340,686 | 8/1994 | Sakaguchi et al. | 430/191 |
| 5,395,727 | 3/1995 | Uetani et al. | 430/192 |
| 5,413,896 | 5/1995 | Kajita et al. | 430/192 |
| 5,601,961 | 2/1997 | Nakayama et al. | 430/192 |
| 5,604,077 | 2/1997 | Kono et al. | 430/192 |
| 5,652,081 | 7/1997 | Tan et al. | 430/192 |
| 5,660,967 | 8/1997 | Nishi et al. | 430/190 |
| 5,674,657 | 10/1997 | Tan et al. | 430/191 |

*Primary Examiner*—John S. Chu
*Attorney, Agent, or Firm*—Ohlandt, Greeley, Ruggiero & Perle, L.L.P.

[57] ABSTRACT

A high thermal alkali-soluble novolak binder resin, comprising the addition-condensation reaction product of a phenolic mixture with at least one aldehyde source, the feedstock of the phenolic mixture for the reaction comprising:

(1) about 25 to about 40 weight percent of the phenolic mixture being a monomer selected from meta-cresol 2,5-xylenol or the combination thereof;

(2) about 50 to about 70 weight percent of the phenolic mixture being para-cresol; and (3) about 3 to about 20 weight percent of the phenolic mixture being acetamidophenol; all percentages based on the weight of total phenol monomer feedstock.

The invention is also directed to a positive working photoresist made from the composition.

20 Claims, No Drawings

SELECTED HIGH THERMAL NOVOLAKS AND POSITIVE-WORKING RADIATION-SENSITIVE COMPOSITIONS

BACKGROUND OF THE INVENTION

1. The Field of the Invention

The present invention relates to specific novolak resins made from acetamidophenol monomer. The present invention further relates to radiation-sensitive compositions useful as positive-working photoresists containing these novolak resins.

2. Brief Description of the Art

As integrated circuits (IC) devices become higher in memory density, photolithographic image patterns formed on wafers are required with less than 0.3 micron in resolution. To achieve this goal, photoresists used for photolithographic imaging are required to have higher resolution, faster sensitivity, and more vertical profiles than the state-of-the-art photoresists of a decade ago.

Most common g/i-line positive working-type photoresists currently used in IC device manufacture consist of an alkaline-soluble polymer (e.g., novolak resin) as a binder resin, and a naphthoquinonediazide (DNQ) ester of a polyphenol compound as the photoactive compound. For example, combinations of novolak-type phenol resins and DNQ esters as a positive-working photoresist are disclosed in numerous U.S. Patents. A photoresist composition of cresol formaldehyde novolak and a DNQ ester of trihydroxybenzophenone is also described in "Introduction to Microlithography" edited by L. F. Thompson (ACS Publishing No. 219, p 112–121) as a typical example.

Photoresist performance is influenced by various factors; e.g., structures of the binder resins, photoactive compounds, and other additives, combinations of these components as well as exposure, development and other process parameters. In particular, the structure/property relationships of the binder resins is one of the most complicated subjects.

Binder resins useful for high-performance photoresist formulations, especially for the g/i-line applications are preferably novolak resins which are prepared by addition-condensation reaction of various phenolic derivatives with various aldehydes or ketones in the presence of acids such as oxalic acid, sulfuric acid, and the like. Among various phenolic derivatives previously used as a monomer of the novolak resins, meta-cresol and para-cresol are some of the most useful monomers.

Most novolak resins are made of various combinations of meta-cresol, para-cresol and other co-monomers such as xylenols as disclosed in U.S. Pat. No. 5,652,081 to Tan et al. This patent discloses a positive working photoresist composition comprising an alkali-soluble resin and a 1,2-quinonediazide compound, the alkali-soluble resin being a novolak resin obtained by the condensation reaction of monomers comprising, among other things, p-cresol, m-cresol, and m-acetamidophenol components, as well as several xylenols. The relative amount of p-cresol, m-cresol, and xylenol is from 95 to 55 mol percent, and the relative amount of m-acetamidophenol is from 5–45 mol percent. However, the relative amounts of p-cresol, m-cresol, and m-acetamidophenol disclosed in this patent are 40–50 mol %, 3 mol %, and 10–20 mol % respectively.

Some of the processing condition employed today in the fabrication of semiconductor devices can easily subject the photoresist patterns to high temperatures above their thermal flow points. This results in severe image distortion, loss of yield and high defects which imposes additional restrictions on the process. As the pattern density continues to increase and the printed features continue to shrink below sub-micron scale, narrow trenches and spaces surrounded by large resist patterns become particularly more vulnerable to the resist thermal deformation obliterating such geometry completely. Post development cure treatments of the resist, such as DUV cure or stepped-up post baking cycles are sometimes necessary to apply to improve the resist thermal flow temperature. This requires additional processing steps and the use of specialized equipment. Despite equipment manufacturer's efforts to produce mild temperature plasma reactors, a large portion of the currently used equipment and processes subject the resist to elevated temperatures and harsh conditions. These processes include reactive ion etching, ion milling, metal sputtering and other harsh plasma environments. The necessity of developing high temperature flow resist with adequate processing conditions is therefore unquestionable. This, however, is usually done by compromising much of the resist lithographic properties, such as photospeed and/or resolution. Novolak resins that exhibit high thermal flow temperatures are usually too high in their molecular weight to provide adequate dissolution in the developer, or too brittle to give good resolution and scum free images and adhesion to the silicon, silicon dioxide or particularly to metal substrate. In other cases, where the resist chemistry is designed to cross link the remaining patterned resist after development, it becomes unstrippable and results in scum and undesirable particles contamination to the devices.

This present invention describes a novel class of phenolic resins suitable for formulating high thermal flow temperature positive radiation sensitive resists that also are characterized by good resolution, photospeed and other desirable lithographic properties.

BRIEF SUMMARY OF THE INVENTION

Therefore, one aspect of the present invention is directed to a high thermal alkali-soluble novolak binder resin, comprising the addition-condensation reaction product of a phenolic mixture with at least one aldehyde source, the feedstock of said phenolic mixture for said reaction comprising:

(1) about 25 to about 40 weight percent of said phenolic mixture being a monomer selected from meta-cresol and 2,5-dimethylphenol;

(2) about 50 to about 70 weight percent of said phenolic mixture being para-cresol; and (3) about 3 to about 20 weight percent of said phenolic mixture being acetamidophenol.

A second aspect of the present invention is directed to a positive-working photoresist composition comprising the admixture of:

(a) a high thermal alkali-soluble novolak binder resin as defined above;

(b) at least one o-quinonediazide photoactive compound, the amount of said photoactive compound or compounds being 35 to 100 percent by weight of said novolak binder resin; and (c) at least one solvent.

Still further, the present invention also encompasses the process of coating substrates with these radiation sensitive mixtures and then exposing and developing these coated substrates.

Also further, the present invention encompasses said coated substrates (both before and after imaging) as novel articles of manufacture.

DETAILED DESCRIPTION OF THE PREFERRED EMBODIMENTS OF THE INVENTION

An alkaline-soluble novolak resin of the present invention is provided by the reaction of aldehyde with phenolic monomers containing (1) m-cresol or 2,5-dimethylphenol (also known as 2,5-xylenol); (2) p-cresol; (3) acetamidophenol (selected from p-, m-, and o- acetamidophenols).

Preferred molar ratios of m-cresol (or 2,5-xylenol), p-cresol, and acetamidophenol in the feedstock of the reaction mixture are as follows:

| Phenolic Compound | Generally (wt %) | Preferred (wt %) | More Preferred (wt %) |
|---|---|---|---|
| m-cresol or 2,5-xylenol | 25–40 | 28–35 | 29–32 |
| p-cresol | 40–70 | 55–65 | 58–63 |
| Acetamidophenol | 3–20 | 5–15 | 8–12 |

The acetamidophenol used in the present composition may be para-, meta-, and ortho-acetamidophenol, or a combination thereof. The structures of p-, m-, and o-acetamidophenol are shown below in Formulae I, II, and III, respectively:

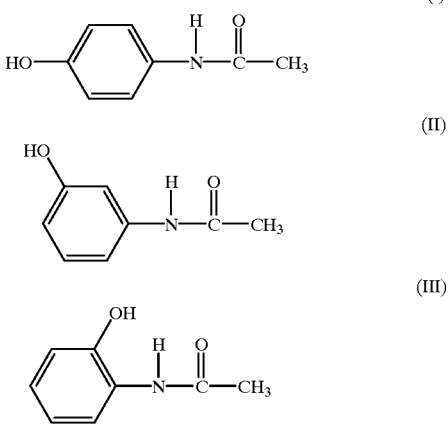

In general, the preferred species of acetamidophenol in the present composition is meta-acetamidophenol.

Aldehydes that should be used in this invention includes formaldehyde, paraformaldehyde, trioxane, acetaldehyde, and chloroacetaldehyde, as well as aldehyde equivalents. Among these, formaldehyde and paraformaldehyde are preferable. In addition, mixtures of more than two different aldehydes can be used. In general, the amount of aldehyde (f/p ratio) added is about 25 to about 110 percent of the stoichiometric amount needed to react with all of the phenolic moieties in the phenolic mixture. Preferably, the amount of aldehyde added is in the range from about 30 percent to about 100 percent phenol unit. The more preferable amount of aldehyde is in the range from about 40 to about 80 percent, is most desirable because these conditions lead to the production of a novolak resin which has a particular good balance of photospeed and thermal resistance properties.

The acid catalyst used for the addition-condensation reaction includes hydrochloric acid, sulfuric acid, formic acid, acetic acid, oxalic acid, and the like. Oxalic acid is preferable due to low residual content by decomposition after high-thermal processing.

The feedstock of the reaction mixture may optionally include other phenolic monomers such as phenol, 2,3-xylenol, 3,4-xylenol, 3,5-xylenol, trimethylphenols, and mixtures thereof. Preferably, if used, these additional phenolic monomers comprise about 1 to about 30 percent by weight based on the total weight of the phenolic mixture.

The novolak resin used in this invention preferably has a weight average molecular weight ($M_w$) of from between 4,000 and 10,000 daltons; preferably 2,000–6,500 daltons. $M_w$ ranges of about 2,000 to about 6,500 are observed to perform best because operating parameters such as photospeed, resolution, and DOF, as well as scum formation and heat resistance are balanced.

The o-quinone photoactive component (hereafter referred to as PAC) used in the present invention may be any o-quinone diazide ester of a polyhydroxy compound. Preferably, it is provided by esterification of 1,2-napthoquinonediazide-5-sulfonyl chloride and/or 1,2-naphthoquinonediazide-4-sulfonyl chloride with a polyhydroxy compound having 2–7 phenolic moieties and in the presence of basic catalyst.

Preferably, the number of the phenolic moieties per one molecule of the polyhydroxy compound used as a backbone of PAC is in the range of 2–7, and more preferably in the range of 3–5.

Some representative examples of polyhydroxy compounds are:

(a) Polyhydroxybenzophenones such as 2,3,4-trihydroxybenzophenone, 2,4,4'-trihydroxybenzophenone, 2,4,6-trihydroxybenzophenone, 2,3,4-trihydroxy-2'-methylbenzophenone, 2,3,4,4'-tetrahydroxybenzophenone, 2,2'4,4'-tetrahydroxybenzophenone, 2,4,6,3',4'-pentahydroxybenzophenone, 2,3,4,2',4'-pentahydroxybenzophenone, 2,3,4,2',5'-pentahydroxybenzophenone, 2,4,6,3',4',5'-hexahydroxybenzophenone, and 2,3,4,3',4',5'-hexahydroxybenzophenone.

(b) Polyhydroxyphenylalkylketones such as 2,3,4-trihydroxyacetophenone, 2,3,4-trihydroxyphenylpentylketone, and 2,3,4-trihydroxyphenylhexylketone.

(c) Bis(polyhydroxyphenyl)alkanes such as bis(2,3,4-trihydroxyphenyl)methane, bis(2,4-dihydroxyphenyl)methane, and bis(2,3,4-trihydroxyphenyl)propane.

(d) Polyhydroxybenzoates such as propyl 3,4,5-trihydroxy-benzoate, phenyl 2,3,4-trihydroxybenzoate, and phenyl 3,4,5-trihydroxybenzoate.

(e) Bis (polyhydroxybenzoyl)alkanes or bis (polyhydroxybenzoyl)aryls such as bis(2,3,4-trihydroxybenzoyl)methane, bis(3-acetyl-4,5,6-trihydroxyphenyl)methane, bis(2,3,4-trihydroxybenzoyl)benzene, and bis(2,4,6-trihydroxybenzoyl)benzene.

(f) Alkylene di(polyhydroxybenzoates) such as ethyleneglycol-di(3,5-dihydroxybenzoate) and ethylene glycoldi(3,4,5-trihydroxybenzoate).

(g) Polyhydroxybiphenyls such as 2,3,4-biphenyltriol, 3,4,5-biphenyltriol, 3,5,3'5'-biphenyltetrol, 2,4,2',4'-biphenyltetrol, 2,4,6,3',5'-biphenylpentol, 2,4,6,2',4',6'-biphenylhexol, and 2,3,4,2',3',4'-biphenylhexol.

(h) Bis(polyhydroxy)sulfides such as 4,4'-thiobis(1,3-dihydroxy)benzene.

(i) Bis(polyhydroxyphenyl)ethers such as 2,2'4,4'-tetrahydroxydiphenyl ether.

(j) Bis(polyhydroxyphenyl)sulfoxides such as 2,2'4,4'-tetrahydroxydiphenylsulfoxide.

(k) Bis(polyhydroxyphenyl)sulfones such as 2,2',4,4'-tetrahydroxydiphenylsulfone.

(l) Polyhydroxytriphenylmethanes such as tris(4-hydroxyphenyl)methane), 4,4',4"-trihydroxy-3,5,3',5'-tetramethyltriphenylmethane, 4,4',3",4"-tetrahydroxy-3,5,3',5'-tetramethyltriphenylmethane, 4,4',2",3",4"-pentahydroxy-3,5,3',5'-tetramethyltriphenylmethane, 2,3,4,2',3',4'-hexahydroxy-5,5'-diacetyltriphenylmethane, 2,3,4,2',3',4',3",4"-octahydroxy-5,5-diacetyltriphenylmethane, and 2,4,6,2',4',6'-hexahydroxy-5,5'-dipropionyltriphenylmethane.

(m) Polyhydroxy-spirobi-indanes such as 3,3,3',3'-tetramethyl-1,1'-spirobi-indane-5,6,5',6'-tetrol, 3,3,3'3'-tetramethyl-1,1'-spirobi-indane-5,6,7,6'6',7'-hexol, and 3,3,3'3'-tetramethyl-1,1'-spirobi-indane-4,5,6,4',5',6'-hexol.

(n) Polyhydroxyphthalides such as 3,3-bis(3,4-dihydroxyphenyl)phthalide, 3,3-bis(2,3,4-trihydroxyphenyl)phthalide, and 3',4',5',6'-tetrahydroxyspiro(phthalide-3,9'-xanthene).

(o) Polyhydroxy compounds described in JP No. 4-253058 such as alpha, alpha' alpha"-tris (4-hydroxyphenyl)-1,3,5-triisopropylbenzene, alpha, alpha', alpha"-tris(3,5-dimethyl-4-hydroxyphenyl)-1,3,5-triisopropylbenzene, alpha, alpha', alpha"-tris (3,5-diethyl-4-hydroxyphenyl)-1,3,5-triisopropylbenzene, alpha, alpha', alpha"-tris (3,5-di-n-propyl-4-hydroxyphenyl)-1,3,5-triisopropylbenzene, alpha, alpha',alpha"-tris(3,5-diisopropyl-4-hydroxyphenyl)-1,3,5-triisopropylbenzene, alpha, alpha', alpha"-tris(3,5-di-n-butyl-4-hydroxyphenyl)-1,3,5-triisopropylbenzene, alpha, alpha', alpha"-tris(3-methyl-4-hydroxyphenyl)-1,3,5-triisopropyl-benzene, alpha, alpha', alpha"-tris(3-methoxy-4-hydroxyphenyl)-1,3,5-triisopropylbenzene, alpha, alpha', alpha"-tris(2,4-dihydroxyphenyl)-1,3,5-triisopropylbenzene, 2,4,6-tris(3,5-dimethyl-4-hydroxyphenylthiomethyl)mesitylene, 1-[alpha-methyl-alpha-(4"-hydroxyphenyl)ethyl]-4-[alpha, alpha'-bis(4"-hydroxyphenyl)ethyl]benzene, 1-[alpha-methyl-alpha-(4'-hydroxyphenyl)ethyl]-3-[alpha, alpha'-bis(4"-hydroxyphenyl)ethyl]benzene, 1-[alpha-methyl-alpha-(3',5'-dimethyl-4'-hydroxyphenyl)ethyl]benzene, 1-[alpha-methyl-alpha-(3'-methoxy-4'-hydroxyphenyl)ethyl]-4-[alpha',alpha'-bis(3'-methoxy-4'-hydroxyphenyl)ethyl]benzene, and 1-[alpha-methyl-alpha-(2',4'-dihydroxyphenyl)ethyl]-4-[alphal,alpha'-bis(4'-hydroxyphenyl)ethyl]benzene.

Other examples of o-quinonediazide photoactive compounds include condensation products of novolak resins with an o-quinonediazide sulfonyl chloride. These condensation products (also called capped novolaks) may be used instead of o-quinonediazide esters of polyhydroxy compounds or used in combination therewith. Numerous U.S. Patents describe such capped novolaks. U.S. Pat. No. 5,225,311 is one such example.

Particularly useful PACs are the o-quinonediazidesulfonyl esters of polyhydroxy phenolic compounds of formulae (IV), (V), and (VI):

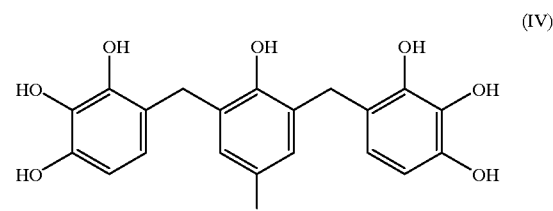

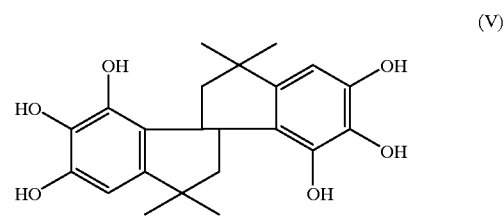

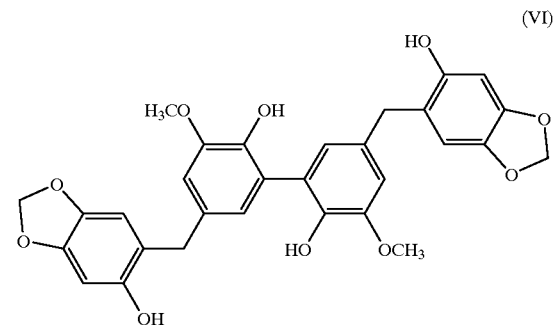

The esterification step for the PAC synthesis is carried out with a basic catalyst such as sodium hydroxide, sodium carbonate, triethylamine, N-methylmorpholine, N-methyldiethylenediamine, 4-dimethylaminopyridine, or combinations thereof.

The following solvents are useful in the reaction: dioxane, acetone, tetrahydrofuran, methyl ketone, N-methyl-2-pyrrolidone, chloroform, methyl chloroform, trichloroethylene, dichloroethane, or combinations thereof.

The degree of the esterification can be controlled by adjusting the molar ratio of the polyhydroxy compound to 1,2-naphthoquinonediazide-5-(and/or -4-) sulfonyl chloride where the degree of the esterification is defined as a mole percent of the phenolic hydroxyl group of the polyhydroxy compound incorporated with DNQ moiety. The degree of esterification of the polyhydroxy backbone can be controlled by adjusting the molar ratio of the hydroxyl groups bound to the polyhydroxy backbone to DNQ sulfonyl chloride moieties in the feedstock. Preferably, this ratio is greater than 1.0 so that not all available hydroxyl groups are derivitized with DNQ moieties.

The amount of PAC in the formulation is in the range of 10–60 parts by weight per 100 parts of novolak resin, and preferably 15–50 parts by weight per 100 parts of novolak resin. If the PAC amount is below 10 parts by weight to the resin, film loss becomes problematic. On the other hand, if the PAC amount exceeds 60 parts by weight, the solubility of the resulting resist formulation to solvent becomes poor and the photospeed may decrease significantly.

Speed enhancers may be optionally added to the photoresist composition to adjust photospeed and improve resolution. Preferably, the speed enhancer is a polyhydroxy compound having 2–7 phenolic hydroxyl groups and molecular weight less than 1,000; more preferably, the speed enhancer has 2–6 phenolic hydroxyl groups and a molecular weight of 150–1000, and more preferably 250–600.

Preferred speed enhancers that may be used in the present invention include resorcin, phloroglucinol, 2,3,4-trihydroxybenzophenone, 2,3,4,4'-tetrahydroxybenzophenone, 2,3,4,3',4',5'-hexahydroxybenzophenone, acetone-pyrogallol condensate, phloroglucide, 2,4,3',4'-biphenyltetrol, 4,4'-thio-bis( 1,3-dihydroxybenzene), 2,2',4,4'-tetrahydroxydiphenyl ether, 2,2',4,4'-tetrahydroxydiphenylsulfoxide, 2,2',4,4'-tetrahydroxy-diphenylsulfone, tris(4-hydroxyphenyl)methane, 1,1-bis(4-hydroxyphenyl)bisphenol, alpha,alpha,alpha',alpha"-tris(4-hydroxyphenyl)-1,3,5-triisopropylbenzene, alpha,alpha',alpha"-tris(4-hydroxyphenyl)-1-ethyl-4-isopropyl benzene, 1,2,2-tris(3,5-dimethyl-4-hydroxyphenyl)dimethylmethane, 2,2,5,5-tetrakis(4-hydroxyphenyl)hexane, 1,2-tetrakis(4-hydroxyphenyl)ethane, 1,1,3-tris(hydroxyphenyl)butane, and [alpha,alpha,alpha',alpha'-tetrakis(4-hydroxyphenyl)]-dimethylbenzene.

The amount of the speed enhancer added to the composition of the invention is preferably in the range of 10–60 parts by weight to 100 parts by weight of alkaline-soluble novolak resin, and more preferably, 20–50 parts by weight.

The solvents included in the photoresist composition of the present invention are used to dissolve the photosensitive compound, alkaline-soluble novolak resin and optional speed enhancer. Useful solvents include, but are not limited to, ethyleneglycol monomethyl ether, ethyleneglycol monoethyl ether, ethyleneglycol monoethyl ether acetate, propyleneglycol methyl ether acetate, propyleneglycol propyl ether acetate, methylbenzene, dimethylbenzene, methylethyl ketone, cyclohexanone, ethyl-2-hydroxypropionate (ethyl lactate) ethyl-2-hydroxy-2-methyl propionate, ethyl hydroxyacetate, 2-hydroxy-3-methyl butanoate, methyl-3-methoxypropionate, ethyl- 3-methoxy propionate, ethyl-3-ethoxypropionate, methyl-3-ethoxy propionate, methyl pyruvate, ethyl pyruvate, butyl acetate, and propyleneglycol monomethylether propionate. These organic solvents may be used either individually or in combination.

A high boiling point solvent such as N-methylformamide, N,N-dimethylformamide, N-methylacetamide, N-dimethylacetamide, N-methyl-2-pyrrolidone, dimethylsulfoxide, or benzylethyl ester may be used in the above-mentioned solvents either individually or in combination and at various ratios.

An anti-striation or leveling agent may also be added to the photoresist composition in order to produce a uniform coating of the resist film on wafers without striation. Such anti-striation or leveling agents level out the resist coating or film to a uniform thickness. In other words, the leveling agent is used to eliminate the formation of striations on the surface of the resist coating once the coating is spun onto the substrate surface. Anti-striation agents may be used up to 5% by weight to a total weight of solids in the resist formulation. One suitable class of anti-striation agents is nonionic silicon-modified polymers. A preferred compound is TROYKYD 366 made by Troy Chemical Co., Newark, N.J. Another suitable class of antistriation agents is fluoroaliphatic polymeric ester surfactants. Another preferred compound is FC-430 FLUORAD made by 3M of St. Paul, Minn. Nonionic surfactants may also be used for this purpose, including, for example, nonylphenoxy poly(ethyleneoxy) ethanol; octylphenoxy (ethyleneoxy) ethanol; and dinonyl phenoxy poly(ethyleneoxy) ethanol; polyoxyethylene lauryl ether; polyoxyethylene oleyl ether; polyoxyethylene octylphenyl ether; polyoxyethylene nonylphenyl ether; polyoxyethylene glycol dilaurate; and polyoxyethylene glycol distearate. Also may be useful are organosiloxane polymers and acrylic acid-containing or methacrylate acid-containing polymers. Other examples of anti-striation or leveling agents include:

(a) a family of polyoxyethylene alkyl ethers such as polyoxyethylene lauryl ether, polyoxyethylene stearyl ether, polyoxyethylene cetyl ether, and polyoxyethylene oleyl ether;

(b) a family of polyoxyethylene alkyl aryl ethers such as polyoxyethylene nonylphenyl ether, and polyoxyethylene polyoxypropylene block copolymers;

(c) sorbitan fatty acid esters such as sorbitan monolaurate, sorbitan monopalmitate, and sorbitan monostearate;

(d) a family of fatty acid esters of polyoxyethylene sorbitan such as polyoxyethylene sorbitan monolaurate, polyoxyethylene sorbitan monopalmitate, polyoxyethylene sorbitan monostearate, and polyoxyethylene sorbitan monotristearate.

Preferably, the amount of anti-striation or leveling agent in the composition of the invention should not exceed two parts by weight per 100 parts by weight of the alkaline-soluble resin and PAC. Preferably, the amount does not exceed one part by weight. These anti-striation or leveling agents may be added either individually or in combination.

Plasticizers improve the coating and adhesion properties of the photoresist composition and better allow for the application of a thin coating or film of photoresist that is smooth and of uniform thickness onto the substrate. Plasticizers which may be used include, for example, phosphoric acid tri-(β-chloroethyl)-ester, stearic acid, dicamphor, polypropylene, acetal resins, phenoxy resins, and are added up to 10% by weight to a total weight of resin and sensitizer.

A light absorbing agent may be added to the composition of the invention to prevent halation from wafers. Preferably, the amount of the light absorbing agent added should not exceed 50 parts by weight to 100 parts by weight of the alkaline-soluble resin; preferably, the amount does not exceed 30 parts by weight, and more preferably, the amount does not exceed 20 parts by weight.

A crosslinking agent may be added to the photoresist composition of the invention in order to improve heat resistance, dry-etch resistance, and photospeed. An example of a useful crosslinking agent is the reaction product of formaldehyde with melamine, benzoguanamine, or glycoluril, epoxy compounds, aldehydes, azides, organic peroxides, and hexamethylenetetramine. The amount of crosslinking agent added should not exceed 10 parts by weight, and preferably 5 parts by weight, to a total weight of the photoresist composition. It has been found that if the amount of crosslinking agent exceeds 10 parts by weight, the photospeed deteriorates and scum is formed on the wafer.

An adhesion promoter may also be added to the photoresist composition of the invention in order to improve the adhesion of the resist film to the wafer and to prevent exfoliation of the resist in the etching manufacturing process. Examples of useful adhesion promoters are trimethylchlorosilane, dimethylvinyl-chlorosilane, methyldiphenylchlorosilane, chloro-methyldimethylchlorosilane, trimethylmethoxysilane, dimethyldiethoxysilane, methyldimethoxysilane, dimethylvinylethoxysilane, diphenyl-dimethoxysilane, phenyltriethoxysilane, hexamethyldisilane, N,N'-bis(trimethylsilyl)urea, dimethyltrimethylsilylamine, trimethylsilylglyoxaline, vinyltrichlorosilane, gamma-chloropropyltrimethoxysilane, gamma-aminopropyltriethoxysilane, gamma-glycidoxypropyltrimethoxysilane, benzotriazole, benzimidazole, indazole, glyoxaline, 2-mercaptobenzimidazole, 2-mercaptobenzthiazole, 2-mercaptopyrimidine-1,1-dimethylurea, and 1,3-dimethylureathiocarbamide.

Preferably, the amount of the adhesion promoter added to the photoresist composition of the invention is less than 10 parts by weight per 100 parts of the resist composition, and more preferably less than 5 parts by weight.

The prepared radiation sensitive resist mixture, can be applied to a substrate by any conventional method used in the photoresist art, including dipping, spraying, whirling and spin coating. When spin coating, for example, the resist mixture can be adjusted as to the percentage of solids content in order to provide a coating of the desired thickness given the type of spinning equipment and spin speed utilized and the amount of time allowed for the spinning process. Suitable substrates include silicon, aluminum or polymeric resins, silicon dioxide, doped silicon dioxide, silicon resins, gallium arsenide, silicon nitride, tantalum, copper, polysilicon, ceramics and aluminum/copper mixtures. The coating surfaces of these substrates may or may not be primed with a conventional adhesion promoter (e.g., hexamethyldisilazane) before the photoresist coating is applied.

The photoresist coatings produced by the above described procedure are particularly suitable for application to silicon wafers coated with a silicon dioxide or silicon nitride layer such as are utilized in the production of microprocessors and other miniaturized integrated circuit components. An aluminum or aluminum-coated substrates may be used as well. The substrate may also comprise various polymeric resins especially transparent polymers such as polyesters and polyolefins.

After the resist solution is coated onto the substrate, the coated substrate is baked at approximately 70° C. to 125° C. until substantially all the solvent has evaporated and only a uniform radiation sensitive coating remains on the substrate. The coated substrate can then be exposed to radiation, especially ultraviolet radiation, in any desired exposure pattern, produced by use of suitable masks, negatives, stencils, templates, and the like. Conventional imaging process or apparatus currently used in processing photoresist-coated substrates may be employed with the present invention. While ultraviolet (UV) light is the preferred source of radiation, other sources of radiation such as visible light, electron or ion beam and X-ray radiant energy may be used instead.

The exposed resist-coated substrates are preferably subjected to a post exposure bake at a temperature from about 100° C. to about 130° C. from about 30–300 seconds to enhance image quality and resolution. The exposed resist-coated substrates are next developed in an aqueous alkaline solution. This solution is preferably agitated, for example, by nitrogen gas. Examples of aqueous alkaline developers include aqueous solutions of tetramethyl-ammonium hydroxide, sodium hydroxide, potassium hydroxide, ethanolamine, choline, sodium phosphates, sodium carbonate, sodium metasilicate, and the like. The preferred developers for this invention are aqueous solutions of either alkali metal hydroxides, phosphates or silicates, or mixtures thereof, or tetramethylammonium hydroxide.

Preferred development techniques include spray development, puddle development, immersion development, or combinations thereof, may also be used.

The substrates are allowed to remain in the developer until all of the resist coating has dissolved from the exposed areas. Normally, development times from about 10 seconds to about 3 minutes are employed.

After selective dissolution of the coated wafers in the developing solution, they are preferably subjected to a deionized water rinse to fully remove the developer or any remaining undesired portions of the coating and to stop further development. This rinsing operation (which is part of the development process) may be followed by blow drying with filtered air to remove excess water. A post-development heat treatment or bake may then be employed to increase the coating's adhesion and chemical resistance to etching solutions and other substances. The post-development heat treatment can comprise the baking of the coating and substrate below the coating's thermal deformation temperature.

In industrial applications, particularly in the manufacture of microcircuitry units on silicon/silicon dioxide-type substrates, the developed substrates may then be treated with a buffered hydrofluoric acid etching solution or plasma gas etch. The resist compositions of the present invention are believed to be resistant to a wide variety of acid etching solutions or plasma gases and provide effective protection for the resist-coated areas of the substrate. Later, the remaining areas of the photoresist coating may be removed from the etched substrate surface by conventional photoresist stripping operations.

The present invention is further described in detail by means of the following examples and comparison examples. However, this invention is not intended to be limited by these examples and comparisons. All parts and percentages are shown by weight percent, and all temperatures are in degrees Celsius, unless explicitly stated otherwise.

EXAMPLE 1

Synthesis of m-Acetamidophenol-Based Novolak

A 500 mL three-necked flask equipped with an overhead stirrer, a water cooled reflux condenser and a thermometer was charged with 30 grams m-cresol, 12.5 grams m-acetamidophenol, 60 grams p-cresol, and 48.7 grams formaldehyde (36.7% aqueous solution). The contents of the flask were stirred to a homogeneous mixture, and 0.88 grams oxalic acid, pre-dissolved in 15 mL deionized (DI) water, was added to the flask. The reaction mixture was heated to 95° C. and held at that temperature for 18 hours. The reflux condenser was replaced with a distillation apparatus, and the volatile contents were distilled of f by raising the temperature of the reaction mixture to 200° C. Distillation was continued for 1.5 hours. Vacuum distillation was performed at 200° C. for 2 hours to distill off residual monomers. The molten novolak resin was cooled to room temperature. The softening temperature of this resin was found to be 160° C. The $M_w$, f/p ratio, dissolution time and $T_{soft}$ were determined and are given in Table 1 below.

EXAMPLE 2

Synthesis of a Second m-Acetamidophenol-Based Novolak

A 500 mL three-necked flask equipped with an overhead stirrer, a water cooled reflux condenser and a thermometer was charged with 32 grams m-cresol, 8 grams m-acetamidophenol, 60 grams p-cresol, and 48.7 grams formaldehyde (36.7% aqueous solution). The contents of the flask were stirred to homogeneous mixture, and 3.02 grams oxalic acid, pre-dissolved in 25 mL deionized (DI) water, was added to the flask. The reaction mixture was heated to 95° C. and held at that temperature for 18 hours. The reflux condenser was replaced with a distillation apparatus, and the volatile contents were distilled off by raising the temperature of the reaction mixture to 200° C. Distillation was continued for 1.5 hours. Vacuum distillation was performed at 200° C. for 2 hours to distill off residual monomers. The molten novolak resin was cooled to room temperature. The softening temperature of this resin was found to be 146° C. The $M_w$, f/p ratio, dissolution time and $T_{soft}$ were determined and are given in Table 1 below.

EXAMPLE 3

Large-Scale Synthesis of m-Acetamidophenol Based Novolak

A 3000 mL reaction kettle equipped with an overhead stirrer, a water cooled reflux condenser and a thermometer, was charged with 400 grams m-cresol, 100 grams m-acetamidophenol, 750 grams p-cresol, and 587.4 grams formaldehyde (36.7% aqueous solution). The contents of the kettle were stirred to homogeneous mixture, and 18.75 grams oxalic acid, pre-dissolved in 312 mL deionized (DI) water, was added to the kettle. The reaction mixture was heated to 95° C. and held at that temperature for 18 hours. The reflux condenser was replaced with a distillation apparatus, and the volatile contents were distilled off by raising the temperature of the reaction mixture to 200° C. Distillation was continued for 1.5 hours. Vacuum distillation was performed at 200° C. for 2 hours to distill off residual monomers. The molten novolak resin was cooled to room temperature. The softening temperature of this resin was found to be 147° C. The $M_w$, f/p ratio, dissolution time and $T_{soft}$ were determined and are given in Table 1.

EXAMPLES 4–14

Following the same procedure of Examples 2–3 (depending on synthesis scale), additional novolak resins were prepared using various combinations of phenolic monomers and various formaldehyde/phenol ratios (f/p). The scale of preparation, softening temperature ($T_{soft}$), and the weight average molecular weight ($M_w$) of the polymers prepared are summarized in Table I. In Table I, "m-C" is meta-cresol, "p-C" is para-cresol, "AAP" is m-acetamidophenol. "$M_w$ (da)" is the polystyrene-converted weight-average molecular weight in daltons of the novolak resin. All molecular weights were determined by Gel Permeation Chromatography (GPC) using styragel columns and a RI detector. "$T_{soft}$" is the softening temperature of the novolak resin in degrees Celsius. The dissolution time "$T_c$" is the time required, in seconds, to dissolve a 1 μm thick film of the novolak resin. "Synthesis scale" refers to the sum of total phenolic monomers charged in the reaction vessel.

TABLE I

| Example | Monomer composition | f/p | Synthesis Scale | $M_w$ (da) | Dissolution Time ($T_c$) (sec) | $T_{soft}$ (°C.) |
|---|---|---|---|---|---|---|
| 1 | m-C/AAP/p-C 30/12.5/60 weight ratio | 0.65 | 102.5 g | 3336 | 128 | 160 |
| 2 | m-C/AAP/p-C 32/8/60 weight ratio | 0.65 | 100.0 g | 3832 | 32 | 146 |
| 3 | m-C/AAP/p-C 30/12.5/60 weight ratio | 0.65 | 1250 g | 7212 | 38 | 147 |
| 4 | m-C/AAP/p-C (40/12.48/50 weight ratio) | 0.65 | 100 g | 3803 | 16 | 147 |
| 5 | m-C/AAP/p-C (30/12.5/60 weight ratio) | 0.70 | 100 g | 3754 | 88 | 156 |
| 6 | m-C/AAP/p-C (34.6/12.5/60) | 0.70 | 100 g | 6173 | 230 | 154 |
| 7 | m-C/AAP/p-C (30/12.5/60 weight ratio) | 0.60 | 100 g | 2825 | 8 | 147 |
| 8 | m-C/AAP/p-C (30/10/60 weight ratio) | 0.65 | 100 g | 4936 | 39 | 149 |
| 9 | m-C/AAP/p-C (30/12.5/60 weight ratio) | 0.63 | 100 g | 3119 | 23 | 149 |
| 10 | m-C/AAP/p-C (30/10/60 weight ratio) | 0.62 | 100 g | 3504 | 14 | 149 |
| 11 | m-C/AAP/p-C (30/10/60 weight ratio) | 0.60 | 100 g | 3113 | 10 | 144 |
| 12 | m-C/AAP/p-C (32/8/60 weight ratio) | 0.67 | 1250 g | 5408 | 29 | 143 |
| 13 | m-C/AAP/p-C (32/8/60 weight ratio) | 0.64 | 1250 g | 5740 | 27 | 144 |
| 14 | p-C/2,5-xylenol/AAP (60/32/8 weight ratio) | 0.65 | 100.0 g | 1250 | 8.5 | 144 |

EXAMPLE 15

Synthesis of O-Quinonediazidesulfonate Esterified Novolaks

A 1000 mL round bottom flask was charged with 100 grams of a novolak prepared from para-cresol, meta-cresol and 3,5-xylenol having a weight average molecular weight of about 3120 daltons and a $T_c$ of 13 seconds. 300 grams of acetone was charged into the flask, and the mixture was stirred to a homogeneous mixture. 17.61 grams of o-quinonediazide sulfonyl chloride dissolved in 25 mL of acetone was charged into the flask, and 0.97 grams of triethylamine was added via an addition funnel over a period of 15 minutes. The mixture was allowed to stir for 1.5 hours. 5.14 grams of oxalic acid was added and the reaction mixture was stirred for 15 minutes. The esterified novolak reaction product was precipitated by addition of 5 liters of deionized (DI) water, and was collected by filtration and washed twice with 2 liters of DI water. The product was dried in a vacuum oven at 45° C. for several hours. The esterified novolak thus generated was found to have 8.67% of o-quinonediazide-5-sulfonyl ester content.

COMPARISON EXAMPLE 1

Synthesis of a Mixed Cresol Formaldehyde Novolak

A 500 mL, three-necked flask equipped with an overhead stirrer, a water cooled reflux condenser and a thermometer was charged with 40 grams m-cresol and 60 grams p-cresol, 49.2 grams of formaldehyde (36.7% aqueous solution). The contents of the flask were stirred to a homogeneous mixture, and 0.25 grams of oxalic acid, pre-dissolved in 5 mL deionized (DI) water, was added. The reaction mixture was heated to 95° C. and held at that temperature for 18 hours. The reflux condenser was replaced with a distillation apparatus, and the volatile contents were distilled off by raising the temperature of the reaction mixture to 200° C. for 2 hours to distill off residual monomers. The molten novolak resin was cooled to room temperature. The dissolution time ($T_c$) of this novolak was found to be 28 sec, and the softening temperature was found to be 139° C.

COMPARISON EXAMPLE 2

Synthesis of a Mixed Cresol Formaldehyde Novolak

Following the procedure described in Comparison 1, an additional mixed cresol-formaldehyde novolak was synthesized from m-cresol (40 g) and p-cresol (60 g) (f/p =0.62) with an weight average molecular weight of 3300 daltons. The dissolution time of this novolak was 20 sec, and its softening temperature was 125° C.

COMPARISON EXAMPLE 3

Synthesis of a Cresol-Xylenol Formaldehyde Novolak

Following the general procedure of Examples 1–3, an additional novolak resin was prepared using a 60:40 weight ratio of p-cresol to 2,5-xylenol with a formaldehyde/phenol ratio (f/p) of 0.70. The synthesis scale of this comparison was 100 g. The $M_w$ of the resulting novolak was 999 with a dissolution time of 2.5 sec and a $T_{soft}$ of 111° C.

EXAMPLES 16–22 AND COMPARISONS 4–7

The following Examples and Comparisons illustrate the preparation and use of photoresists formulated with acetamidophenol-based novolaks of Examples 2, 8 or 12, or Comparison novolaks of comparison Examples 1 and 2.

Preparation of Photoresist

The resist components were blended in amber colored glass bottles. The order of addition of resist components was:

1. Solvent (methyl 3-methoxypropionate (MMP), or ethyl 3-ethoxypropionate (EEP), or ethyl Lactate (EL), or a combination of one or more of these solvents)

2. novolak 3. photoactive compound (PAC) and esterified novolak 4. leveling agent.

The novolak and photoactive compound components were weighed on an electronic balance having an accuracy to ±0.01 grams. The solid components (novolak and PAC) were added slowly to the solvents, which were stirred using a magnetic stir bar throughout the addition. Several PACs were chosen for use in the following photoresist formulations.

PAC-1 is a mixture of o-quinonediazidesulfonyl esters of a pyrogallol based polyhydroxyaromatic compound represented by the following general structure (IV):

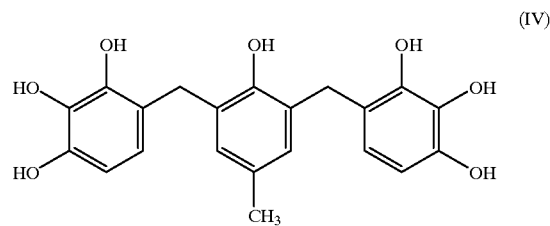

This polyhydroxyaromatic compound was esterified using 5.25 moles of o-quinonediazidesulfonyl chloride for each mole of polyhydroxy compound. The method of preparation of this photoactive compound is described in U.S. Pat. No. 4,992,356.

PAC-2 is a mixture of o-quinonediazidesulfonyl esters of a polyhydroxy aromatic compound represented by the following structure (V):

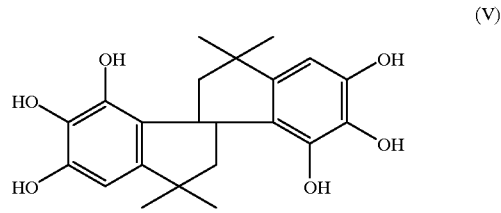

Each mole of this polyhydroxyaromatic compound was esterified using 5.5 moles of o-quinonediazidesulfonyl chloride . The method of preparation of this compound is described in SPIE Vol. 1262 Advances in Resist Technology and Processing VII, 1990, p513.

PAC-3a is o-quinonediazidesulfonyl ester of a dehydrodivanillin-based polyhydroxy aromatic compound represented by the following general formula (VI):

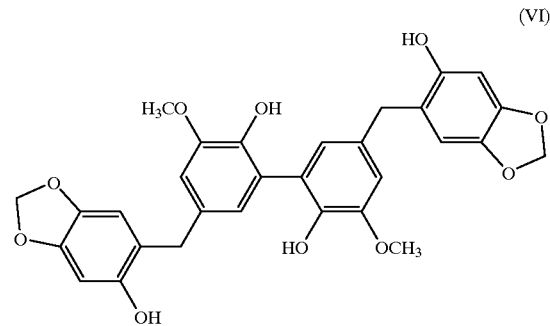

In the synthesis of PAC-3a, one mole of polyhydroxyaromatic compound was reacted with 2.36 moles of o-quinonediazide-sulfonyl chloride. PAC-3b has the same backbone as PAC-3a. PAC-3b was synthesized using 1.96 moles of o-quinonediazide-sulfonyl chloride for each mole of polyhydroxyaromatic compound. The method of preparation of PACs 3a and 3b is described in U.S. Pat. No. 5,602,260.

A leveling agent, e.g., FLUORAD FC-430 (fluorinated polymeric surfactant available from 3M Corporation was added at a concentration of 0.03% by weight of the resist sample. When all the components had dissolved, the resist samples were microfiltered directly into clean bottles. These formulations are summarized in Table II.

TABLE II

| Example or Comparison | Novolak source | % Novolak | PAC source | % PAC | % Amt. of Esterified Novolak (Example 15) | Solvents |
|---|---|---|---|---|---|---|
| 16 | Example 12 | 73 | PAC-1 | 12 | 15 | MMP (100) |
| 17 | Example 12 | 73 | PAC-1 | 12 | 15 | EL/EEP (80:20) |
| 18 | Example 12 | 73 | PAC-1 | 12 | 15 | MMP/EEP (90:10) |
| C-4 | Comparative Example 2 | 73 | PAC-1 | 12 | 15 | MMP/EEP (90:10) |
| C-5 | Comparative Example 2 | 73 | PAC-1 | 12 | 15 | MMP (100) |
| 19 | Example 2 | 80 | PAC-2 | 20 | 0 | EL/EEP (80:20) |
| 20 | Example 8 | 80 | PAC-2 | 20 | 0 | EL/EEP (80:20) |
| C-6 | Comparative Example 1 | 80 | PAC-2 | 20 | 0 | EL/EEP (80:20) |
| 21 | Example 2 | 76 | PAC-3a | 24 | 0 | EL/EEP (80:20) |
| 22 | Example 2 | 76 | PAC-3b | 24 | 0 | EL/EEP (80:20) |
| C-7 | Comparative Example 1 | 76 | PAC-3 | 24 | 0 | EL/EEP (80:20) |

Coating Softbaking, Exposure, Post Exposure Baking, and Developing of the Photoresists A positive tone image was generated by the following procedure:

Four-inch silicon wafers were spin coated with photoresist by applying 3 mL of photoresist formulations shown in Table II to each wafer held in a spinner. The wafers were then spun to give a uniform film thickness of photoresist of approximately 1.1 µm. The photoresist-coated wafers were then softbaked at 90° C. for 60 seconds to remove the residual solvents. The softbaked photoresist-coated wafers were then exposed for lithographic evaluation. After completion of exposure, the wafers were subjected to a post exposure bake (PEB) by heating at 120° C. for 60 seconds. The wafers were then puddle or spray-developed using a 0.262N tetramethylammonium hydroxide (TMAH) aqueous developer for 60 seconds. A deionized water rinse was applied to each wafer for 20 seconds while spinning, followed by application of dry nitrogen gas to dry the wafers.

Each imaged, photoresist-coated wafer substrate was evaluated for heat resistance, exposure threshold ($E_{th}$), optimum photospeed ($E_{opt}$) and equal line/space pair resolution (res.).

Photoresist Evaluations

The lithographic properties of the photoresist formulations of Table II are provided in Table III below:

TABLE III

| Resist Example | $E_o$ (mJ/cm$^2$) | $E_{opt}$ (mJ/cm$^2$) | EM ($E_{opt}/E_o$) | Resolution (µ) | Heat resistance (°C.) |
|---|---|---|---|---|---|
| 19 | 59 | 86 | 1.45 | 0.42 | 135–140 |
| 20 | 44 | 80 | 1.81 | 0.41 | 130 |
| 21 | 47 | 67 | 1.42 | 0.45 | 128 |
| 22 | 38–47 | ~52 | 1.3 | 0.45 | 122 |
| (comparative) | | | | | |
| 23 | 38 | 44 | 1.15 | 0.47 | 128 |
| (comparative) | | | | | |
| 24 | 47 | 80 | 1.70 | 0.42 | 130–135 |
| 25 | 70 | 110 | 1.57 | 0.40 | 135 |
| 26 | 48 | 73 | 1.52 | 0.42 | 115–120 |
| (comparative) | | | | | |
| 27 | 68 | 152 | 2.23 | 0.40 | 125–130 |
| 28 | 56 | 114 | 2.03 | 0.40 | 125 |
| 29 | 71 | 130 | 1.83 | 0.35 | 115 |
| (comparative) | | | | | |

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A high thermal alkali-soluble novolak binder resin, comprising the addition-condensation reaction product of a phenolic mixture with at least one aldehyde source, the feedstock of said phenolic mixture for said reaction comprising:

(1) about 25 to about 40 weight percent of said phenolic mixture being a monomer selected from meta-cresol and 2,5-xylenol and the combination thereof;

(2) about 40 to about 70 weight percent of said phenolic mixture being para-cresol; and (3) about 3 to about 20 weight percent of said phenolic mixture being acetamidophenol, all percentages based on the weight of the total phenolic monomer feedstock;

the high thermal property of the novolak binder resin being obtained without the necessity for fractionation of the novolak binder resin.

2. The alkali-soluble novolak binder resin of claim 1, wherein the feedstock of said phenolic mixture for said reaction comprises about 28 to about 35 weight percent of meta-cresol or 2,5-xylenol or the combination thereof; about 55 to about 65 weight percent of para-cresol; and about 5 to about 15 weight percent of acetamidophenol.

3. The alkali-soluble novolak binder resin of claim 1, wherein the feedstock of said phenolic mixture for said reaction comprises about 29 to about 32 weight percent of meta-cresol; about 58 to about 63 weight percent of para-cresol; about 8 to about 12 weight percent of acetamidophenol.

4. The alkali-soluble novolak binder resin of claim 1, wherein said aldehyde source is selected from the group consisting of formaldehyde, paraformaldehyde, trioxane, acetaldehyde, chloroacetaldehyde and combinations thereof.

5. The alkali-soluble novolak binder resin of claim 1, wherein said phenolic mixture further comprises about 1 to about 30 weight percent of a xylenol selected from the group consisting of 2,3-xylenol, 3,4-xylenol, 3,5-xylenol, and mixtures thereof.

6. The alkali-soluble novolak binder resin of claim 1, wherein said alkali-soluble novolak binder resin has a weight-average molecular weight ($M_w$) of about 1,000 to about 10,000 daltons.

7. The alkali-soluble novolak binder resin of claim 1, wherein said alkali-soluble novolak binder resin has a weight-average molecular weight ($M_w$) of about 2,000 to about 6,500 daltons.

8. The alkali-soluble novolak binder resin of claim 1, wherein said addition condensation reaction utilizes and acid catalyst selected from the group consisting of hydrochloric acid, sulfuric acid, formic acid, acetic acid, oxalic acid, and combinations thereof.

9. The alkali-soluble novolak binder resin of claim 1, wherein the amount of said aldehyde source is from 25 to about 110 percent of the stoichiometric amount needed to react with all of the phenolic moieties in said phenolic mixture.

10. The alkali-soluble novolak binder resin of claim 1, wherein said acetamidophenol is meta-acetamidophenol.

11. A positive-working photoresist composition, comprising the admixture of:
(a) a high thermal alkali-soluble novolak binder resin comprising the addition-condensation reaction product of a phenolic mixture with at least one aldehyde source, the feedstock said phenolic mixture for said reaction comprising:
(1) about 25 to about 40 weight percent of said phenolic mixture being a monomer selected from meta-cresol, 2,5-xylenol and the combination thereof;
(2) about 40 to about 70 weight percent of said phenolic mixture being para-cresol; and
(3) about 3 to about 20 weight percent of said phenolic mixture being acetamidophenol; all percentages based on the weight of the total phenolic monomer feedstock;
(b) at least one o-quinone photoactive compound, the amount of said photoactive compound or compounds being 10 to 60 percent by weight of said novolak binder resin; and
(c) at least one solvent;
the high thermal property of the novolak binder resin being obtained without the necessity for fractionation of the novolak binder resin.

12. The positive-working photoresist composition of claim 11, wherein the feedstock of said phenolic mixture for said reaction comprises about 28 to about 35 weight percent of meta-cresol; about 55 to about 65 weight percent of para-cresol; and about 5 to about 15 weight percent of acetamidophenol.

13. The positive-working photoresist composition of claim 11, wherein the feedstock of said phenolic mixture for said reaction comprises about 29 to about 32 weight percent of meta-cresol; about 58 to about 63 weight percent of para-cresol; about 8 to about 12 weight percent of acetamidophenol.

14. The positive-working photoresist composition of claim 11, wherein said alkali-soluble novolak binder resin has a weight-average molecular weight ($M_w$) of about 1,000 to about 10,000.

15. The positive-working photoresist composition of claim 11, wherein said alkali-soluble novolak binder resin has a weight-average molecular weight ($M_w$) of about 2,000 to about 6,500.

16. The positive-working photoresist composition of claim 11, wherein said photoactive compound is selected from the group consisting essentially of o-quinonediazidesulfonyl esters of polyhydroxy compounds having 2–7 phenolic moieties.

17. The positive-working photoresist composition of claim 11, wherein said photoactive compound is at least one condensation reaction product of an o-quinonediazide sulfonyl chloride with at least one novolak resin.

18. The positive-working photoresist composition of claim 11 wherein said photoactive compound is a mixture of at least one o-quinonediazide ester of a polyhydroxy compound having 2–7 phenolic moieties with at least one condensation reaction product of an o-quinonediazide sulfonyl chloride with at least one novolak resin.

19. The positive-working photoresist composition of claim 11, wherein said solvent is selected from methyl-3-methoxypropionate, ethyl-3-ethoxypropionate, ethyl lactate, and combinations thereof.

20. The positive-working photoresist composition of claim 11, wherein said acetamidophenol is meta-acetamidophenol.

* * * * *